United States Patent [19]

Hagewood

[11] Patent Number: 4,929,698

[45] Date of Patent: May 29, 1990

[54] NEW POLYESTER YARNS HAVING PLEASING AESTHETICS

[75] Inventor: John F. Hagewood, Mathews, N.C.

[73] Assignee: E. I. Du Pont de Nemours and Company, Wilmington, Del.

[21] Appl. No.: 318,798

[22] Filed: Mar. 3, 1989

Related U.S. Application Data

[63] Continuation-in-part of Ser. No. 207,077, Jun. 14, 1988, abandoned, Continuation-in-part of Ser. No. 53,308, May 22, 1987, abandoned.

[51] Int. Cl.$^5$ ............................................. C08G 63/02
[52] U.S. Cl. .................................... 528/272; 528/295; 528/308; 528/308.2; 428/370; 428/373; 428/378; 428/395; 264/176.1; 264/177.13; 264/177.17; 264/211.12; 57/243; 57/244; 57/905
[58] Field of Search ............ 528/272, 295, 308, 308.2; 264/176.1, 177.13, 177.17, 211.12; 57/243, 244, 905; 428/370, 373, 378, 395

[56] References Cited

U.S. PATENT DOCUMENTS

| | | | |
|---|---|---|---|
| 3,748,844 | 7/1973 | Pacofsky | 57/140 R |
| 3,977,175 | 8/1976 | Yoshikawa et al. | 57/288 |
| 3,998,042 | 12/1976 | Reese | 57/245 |
| 4,019,311 | 4/1977 | Schippers | 57/245 |
| 4,041,689 | 8/1977 | Duncan et al. | 57/140 J |
| 4,059,949 | 11/1977 | Lee | 428/229 |
| 4,118,534 | 10/1978 | Stanley | 428/370 |
| 4,156,071 | 5/1979 | Knox | 528/272 |
| 4,233,363 | 11/1980 | Cemel et al. | 428/373 |
| 4,444,710 | 4/1984 | Most, Jr. | 264/209.5 |

*Primary Examiner*—John Kight, III
*Assistant Examiner*—Sam A. Acquah

[57] ABSTRACT

Flat polyester yarns that provide soft pleasing fabrics that can easily be brushed (or napped) to enhance their aesthetics, on account of their unusually low tenacity, that consist essentially of cationic dyeable polyester filaments, and corresponding spin-oriented feed yarns that may be processed into such flat yarns by draw-warping.

4 Claims, No Drawings

NEW POLYESTER YARNS HAVING PLEASING AESTHETICS

CROSS-REFERENCE TO RELATED APPLICATION

This application is a continuation-in-part of application Ser. No. 07/207,077, filed June 14, 1988, now abandoned, which is itself a continuation-in-part of application Ser. No. 07/053,308, filed May 22, 1987, now abandoned.

DESCRIPTION

1. Technical Field of the Invention

This invention relates to new polyester yarns having pleasing aesthetics, and is more particularly concerned with new flat yarns consisting essentially of cationic dyeable polyester filaments that provide soft pleasing fabrics whose aesthetics can be further improved by napping, and to feed yarns consisting essentially of cationic dyeable polyester spin-oriented filaments for processing into such new flat yarns by draw-warping.

2. Background

Synthetic polyester filaments of poly(ethylene terephthalate) were suggested some fifty years ago by Whinfield and Dickson, U.S. Pat. No. 2,465,319, and have been produced commercially for some forty years, and have for many years been the most widely-used and manufactured synthetic polymer filaments, because of their advantageous properties. Currently, polyester textile yarns are used for many widely-differing articles of apparel requiring polyester yarns in several different forms, and correspondingly manufactured by different processing techniques. Broadly speaking, there are two main categories of polyester apparel yarns, namely spun yarns (from polyester staple fiber, with which the present invention is not concerned) and multifilament (continuous filament) yarns which, themselves, again comprise two main categories, i.e., textured yarns (whose filaments are crimped, usually by false-twisting, with which the present invention is not concerned) and flat (i.e., untextured) yarns. The present invention is concerned with flat multifilament polyester yarns.

Flat yarns are used in several different types of fabrics, e.g., in satins, which may be made by knitting. As was already explained some years ago by Knox, in U.S. Pat. No. 4,156,071, although the high strength of polyester filaments may be of advantage in many fabric applications, there are also certain applications for which it had previously been preferred to use yarns and filaments of lower modulus, such as cellulose acetate, in preference over conventional drawn polyester filament yarns. In other words, the high strength of conventional polyester filaments and yarns, that can be so advantageous for certain end-uses, may have been a disadvantage for other specific end-uses.

Although many polyester polymers (including copolymers) have been suggested, the most widely manufactured and used polyester hitherto has been poly(ethylene terephthalate), which is often referred to as homopolymer. Homopolymer has generally been preferred over copolymers because of its lower cost, and also because its properties have been entirely adequate, or even preferred, for most end-uses. Homopolymer is often referred to as 2G-T. Poly[ethylene terephthalate/5-sodium-sulfo-isophthalate] copolyester has, however, also been manufactured and used commercially in considerable quantities for some thirty years, especially for staple, and such copolyester filaments and yarns were first suggested by Griffing and Remington in U.S. Pat. No. 3,018,272 A very desirable feature of this copolyester is its affinity for cationic dyes. Commercially, such copolyester, used for making continuous filaments as well as staple fibers, has contained about 2 mole % of the ethylene 5-sodium-sulfo-isophthalate repeat units, and such copolyester has often been referred to as 2G-T/SSI. An example of a prior suggestion for using spin-oriented multilobal filaments of this copolyester as a draw-texturing feed yarn is in Example VI of Duncan and Scrivener, U.S. Pat. No. 4,041,689. (Filaments of such 2G-T/SSI have also been melt-spun with 2G-T (homopolymer) filaments (referred to as cospinning), e.g. in equal 50/50 amounts, to make heather yarns that can be differentially-dyed to give a mixed-color appearance, as suggested by Reese in U.S. Pat. No. 3,593,513 and Cemel et al. in U.S. Pat. No. 4,233,363, but the present invention is not concerned with such cospun heather mixed filament yarns.)

The present invention concerns new polyester yarns consisting essentially of these cationic dyeable copolymer filaments, sometimes referred to as (2G-T/SSI).

SUMMARY OF THE INVENTION

The present invention provides, in one aspect, a flat multifilament interlaced textile yarn consisting essentially of poly[ethylene terephthalate/5-sodium-sulfoisophthalate] copolyester filaments containing about 2 mole % of ethylene 5-sodium-sulfo-isophthalate repeat units, being of denier about 20 to about 150, and preferably of denier at least about 40, and having a tenacity of about 1.5 to about 2.5 grams per denier, and preferably about 1.8 to about 2.2 grams per denier, in other words about 2 gpd, and elongation to break of about 10 to about 50%, preferably about 20 to about 40%, and preferably of relatively low modulus, preferably of about 40 to about 60 grams per denier, of boil-off shrinkage about 2 to about 10%, and preferably about 3 to about 7%, and especially about 5 to about 7%, and preferably a dry heat shrinkage, measured at 160° C., of about 4 to about 15%. These new yarns have been knitted into fabrics having very pleasing aesthetics, especially satin fabrics, having a pleasing softness, and have proved remarkably easy to nap (to improve their aesthetics, e.g., softness). It is believed that this advantageous property is a result of the unusually low filament strength, combined with low elongation, which is believed to be exceptional in contrast to commercially-available polyester filaments in flat textile yarns in current commercial use. For this reason, it is expected that yarns having relatively low denier per filament (dpf) below about 5 dpf will be especially useful, and particularly yarns of about 1.5 to about 3 dpf. The flat yarns of the invention also have a surprising advantage in their uniformity, which can be indicated as a low standard deviation for the boil-off shrinkage, generally less than about 1%, and preferably less than about 0.25%, which contrasts favorably with prior flat copolyester yarns that have been available commercially, unless special measures are taken to improve this uniformity, which increases the cost.

These new flat yarns may be conveniently and advantageously prepared by draw-warping spin-oriented copolyester filaments of high shrinkage, about 40% or more, and high elongation, about 80 to 180%, prepared by high speed spinning at speeds of the order of 3,000 yards per minute.

Accordingly, in another aspect of the invention, there is also provided an interlaced multifilament draw-warping feed yarn consisting essentially of spin-oriented poly[ethylene terephthalate/5-sodium-sulfo-isophthalate] copolyester filaments containing about 2 mole % of ethylene 5-sodium-sulfo-isophthalate repeat units, being of denier about 40 to about 300, having an average interlace level of about 5.5 to about 9.5 RPC, and preferably less than about 7.5 RPC and being provided with a finish that is stable enough to persist on such yarn after draw-warping in sufficient quantity and in such condition as to provide finish to enhance knitting performance. Different feed yarns have been proposed for the entirely different objective of draw-texturing, but essentially similar individual spin-oriented filaments are believed to be suitable for inclusion in both of these two different feed yarns. However, contrary to the preference for making DTFY, it is preferred to spin the 2G-T/SSI filaments for the feed yarns according to the invention at withdrawal speeds of less than about 3000 ypm, and especially to make feed yarns of lower dpf to provide warp-drawn yarns of low dpf within the ranges indicated herein.

There is also provided a process for preparing a flat multifilament interlaced textile yarn as described above by first forming such draw-warping feed yarn by high speed spinning spin-oriented copolyester into filaments of shrinkage at least about 40%, and elongation about 80% to about 180%, followed by draw-warping the feed yarn to reduce the elongation and shrinkage to the desired amounts.

DETAILED DESCRIPTION OF THE INVENTION

Once the concept and advantages of the new yarns of the present invention have been suggested, many of the details of preparation and of possible variations will be readily apparent to one skilled in this art. The preparation of polyester (including copolyester, 2G-T/SSI) polymers for making synthetic polymer filaments has already been described in the art, including the literature referred to herein, and literature referred to therein. Preferably, the filaments should be melt-spun by a continuous process, whereby the polymer is prepared continuously and spun into filaments without solidification and remelting, because such continuous process improves the uniformity of the resulting filaments and yarns, and this is of great importance in subsequent processing and for the customers. There has also been much disclosure since the early 1970's of the preparation of spin-oriented polyester filaments by melt-spinning at high withdrawal speeds of the order of about 3,000 ypm or more. For example, this was first suggested by Petrille, U.S. Pat. No. 3,771,307 and by Piazza and Reese, U.S. Pat. No. 3,772,872, to prepare draw-texturing feed yarns. As explained, the use as draw-texturing feed yarns is entirely different from the preparation of flat yarns, which are not textured, and for which end-uses a severe mechanical crimp in the filaments is generally undesired. Furthermore, as explained in copending application Ser. No. 034,429, filed by Butler and Sivils, although large quantities of homopolymer DTFY have been manufactured and draw-textured, hitherto 2G-T/SSI spin-oriented filaments have not been so satisfactory as DTFY, so that the manufacture and use of spin-oriented yarns consisting essentially of 2G-T/SSI filaments has been very much smaller than of homopolymer, despite the advantage of cationic-dyeability. Nevertheless, so far as the substrate spin-oriented filaments are concerned, the preparation of spin-oriented polyester filaments has long been known and practiced commercially. For use as feed yarns for draw-warping, according to the present invention, there are at least the following significant differences, and possibly additional preferences will become apparent as further experience is obtained in the practice of the present invention First, for DTFY, it is desirable to provide a low degree of interlace. Interlacing and interlaced yarns were first disclosed in the various Bunting and Nelson patents, e.g., U.S. Pat. No. 2,985,995, and a higher degree of interlacing was disclosed by Gray in U.S. Pat. No. 3,563,021, and a procedure for rapidly measuring interlace on a device described by Hitt in U.S. Pat. No. 3,290,932. This was used to measure all the interlace herein as RPC. As explained in the art, any interlace level is measured according to the distance between interlace nodes. (The device is understood to convert these node length distances in cm to RPC, i.e., to 10 log 10 values thereof). In other words, the larger the value (representing a larger distance between interlace nodes) the lower the degree of interlace. For DTFY, a low degree of interlace (i.e., a relatively high RPC) is generally desirable; in other words, a high degree of interlace (a low RPC) is not desirable during texturing. Thus, for DTFY purposes, it is generally desirable to provide a low degree of interlace as indicated by a relatively high RPC of 11 to 12. It will be understood that any such value is an average value, since the interlace may vary widely along any individual end, so, herein, all references to interlace RPC are to the average of at least 100 measurements, and preferably an even higher number. Although one may imagine that an interlaced yarn is uniformly interlaced along each end, this is not generally achieved in practice (and may not even be desirable). In contrast to the desideratum of a low degree of interlace (high RPC) for DTFY, it is desirable for draw-warping feed yarn, according to the present invention, to provide a much higher degree of interlace (as indicated by a smaller distance between nodes, i.e., RPC of less than 10). Again, it will be understood that these interlace levels are averages; thus, in practice, there is likely to be a variation of the degree of interlace; so there may be some portions of any yarns with undesirably low degrees of interlace, corresponding to what could (if such low degree would have been maintained throughout the whole yarn) have been suitable for a DTFY. According to the invention, a high degree of interlace is required because, after draw-warping (which will extend the distance between the interlace nodes, i.e., raise the RPC and lower the degree of interlace) the amount of interlace should be such as is desired for further processing of the drawn yarns, usually in fabric formation, e.g., by warp knitting. Accordingly, it is preferred that the degree of interlace be such that the (average) RPC be less than about 9.5, and it will generally be preferred to have an even higher degree of interlace, as shown by a value of less than about 7.5. This higher interlace is obtained most conveniently in practice by increasing the air pressure used for interlacing. The precise amount of interlace will generally depend on what is desirable in the final fabric containing the drawn yarns, especially for aesthetic purposes. It is generally difficult to obtain a degree of interlace higher than is indicated by a value of about 5.5 RPC at the high withdrawal speeds of the order of 3000 ypm that are used herein.

A second important consideration for draw-warping feed yarns, according to the present invention, is in relation to the finish. It has been customary to provide all filament yarns (as-spun) with a coating, generally referred to as a (spin-)finish, since the provision of such finish is generally the first contact of any freshly-extruded filament with any solid material, i.e., with anything other than the quenching air or any casual contact with a guide, which is usually undesirable before application of the spin finish. According to the present invention, the finish that is provided on the feed yarn should be stable enough to persist on such yarn even after it has been draw-warped, and it should persist in sufficient quantity and in such condition as to provide finish to enhance the subsequent processing of the drawn yarn, usually knitting to form the desired fabric. Hitherto, for DTFY, the objective of a spin-finish has been to maximize draw-texturing performance, as mentioned, e.g., by Piazza and Reese in U.S. Pat. No. 3,772,872, and in other publications discussing the importance of providing the optimum properties for processing on a draw-texturing machine. In contrast, just as with the interlace pin count, for a draw-warping feed yarn according to the present invention, it is desirable to provide a finish that is not only satisfactory for processing through the draw-warping machine, but also persists enough to avoid the need for further application of finish materials for subsequent processing, e.g., on a warp knitting machine. Thus, an acceptable finish for such draw-warping feed yarns consists of a major amount of low volatility ester, lesser amounts of low volatility emulsifiers, up to about 10% of mixed antistat components, a minor, but effective amount of alkoxylated polydimethylsiloxane or perfluorinated alcohol-derived wetting agent; and a minor, but effective amount of antioxidant. Such acceptable finishes have a viscosity between about 50 and 200 centipoise at 25° C., a smoke point of greater than 240° C, and a volatility of less than 30% at 200° C. and less than 15% at 180° C., when a 1.0 gram sample is exposed in a forced draft oven for 120 minutes. Thus, an acceptable finish used for such draw-warping feed yarns is "Lurol 2233", available from the George A. Goulston Company, 700 N. Johnson St., Monroe, NC, 28110.

Thus, although it might be feasible to use alternative feed yarns for draw-warping, and then to make the corresponding adjustments during or after the draw-warping process, before further processing, e.g., knitting, it is preferable and more economical to provide all the desired characteristics in the actual draw-warping feed yarn. Thus, for example, it is feasible to increase the degree of interlacing on certain draw-warping machines that are provided with interlacing air jets, but this would increase the cost of the draw-warping process, so is not as preferred as providing sufficient interlace in the feed yarn. Similarly, it might be feasible to apply further finish during or after the draw-warping process, and this is sometimes referred to as overlubing, but this again would increase the cost. It will also be understood that some finishes that may have been suggested or even applied for DTFY could possibly have the capability of persisting through a draw-warping operation, depending on the processing conditions, and so, if applied in sufficient amount, may prove equally suitable for use with draw-warping feed yarns according to the present invention, even if this use has not previously been suggested. However, not all finishes that have been used commercially and that have proved extremely satisfactory during the draw-texturing of DTFY have proved satisfactory for use for draw-warping feed yarns according to the present invention. Some prior DTFY finishes have fumed excessively, and this can present an unpleasant situation, or even a toxic hazard to operators unless special measures are taken to avoid this problem, whereas most draw-texturing machines are constructed differently, so that this problem is not so apparent, or sufficient fumes are vented away in the course of normal operation without the need (and cost) of providing special measures.

Draw-warping is a process that has achieved considerable technical and commercial interest in recent years, because of its commercial advantages, and has been described in many publications, including Seaborn, U.S. Pat. No. 4,407,767, and by Frank Hunter in Fiber World, September, 1984, pages 61–68, in articles in Textile Month, May, 1984, pages 48–50 and March, 1985, page 17, and in Textile World, May, 1985, page 53, and in other articles, including the February, 1985, issue of Chemiefasern/Texteilindustrie, and there are several commercial firms offering commercial draw-warping machines and systems, who have provided literature and patents. Thus, the concept and practice of draw-warping is already known to those skilled in the art. Various terms, such as "warp-drawing" and "draw-beaming" have been used additionally, but, primarily, herein, the term "draw-warping" is preferred.

As has been indicated already, and as is evident hereafter, it is feasible to provide new flat yarns according to the invention having many interesting and advantageous properties, and some of these are quite surprising. Perhaps among the most surprising is that such copolyester filaments can provide fabrics of pleasing aesthetics, primarily softness (in addition to the bright colors that can be obtained on account of the affinity to cationic dyestuffs), and that these pleasing aesthetics may be further enhanced by a process known as brushing or napping. Indeed, fabrics containing the flat yarns according to the invention have been found particularly and surprisingly adaptable to napping, and it is believed that the energy requirements and even the number of passes necessary to achieve a desired effect can be less than has been experienced with fabrics containing existing commercial polyester yarns, and this is of great interest and economic advantage. It is believed that this ability can now be rationalized by tensile characteristics of such new flat yarns of the invention, since it is believed that such filaments break more easily during the napping (or brushing) process than conventional polyester filaments that are commercially available. This ability may well be a result of a lower tensile strength and/or modulus, which is believed to be lower than that of comparable commercially-available flat yarns even from the same copolyester (2G-T/SSI). In this respect, it will be understood that it is desirable to provide filaments and yarns that have sufficiently good tensile properties (including uniformity) so that they can provide textile processing, without excessive filament breaks, e.g., during the draw-warping and knitting operations, but provide the desired broken filaments during the brushing operation with a minimal number of passes and consumption of energy, since broken filaments at an earlier stage in processing is undesired because it can cause processing difficulties and even stoppage of the machine and rejection of the fabric or yarns for poor quality reasons. Thus, there is a fine line between the ability to provide good performance during brushing and the ability to withstand earlier processing, and this ability to satisfy both requirements has been demonstrated to a surprising degree by the new flat yarns according to the present invention.

The invention is further illustrated in the following Examples. All of the copolyester feed yarns were of 2G-T/SSI copolyester and all except Example 3 were spin-oriented filaments prepared by high speed spinning at withdrawal speeds of about 2800–2900 ypm. Most of the properties herein are measured as described in Knox U.S. Pat. No. 4,156,071, the method for determining LRV is disclosed in Most, U.S. Pat. No. 4,444,710, and the interlace pin count is measured by the device described by Hitt in U.S. Pat. No. 3,290,932.

EXAMPLE 1

A 90 denier, clear, copolyester feed yarn was produced on standard DTFY spinning equipment, except that this product was made with high interlace and a suitable finish, as described hereinbefore, selected because this feed yarn was made for draw warping according to the invention. Feed yarn properties are given in Table IA.

TABLE IA

| Denier | 88 |
|---|---|
| % Denier Spread | 3.2 |
| Draw Tension (1.71X @ 185° C.) | 33.1 |
| Interlace, RPC | 6.5 |
| Filament Shape | trilobal |
| No. of filaments | 34 |
| % FOY | 0.78 |
| % TiO2 | 0.002 |
| Polymer LRV | 13.2 |

This feed yarn was draw warped at 1.51 draw ratio in various different arrangements on both a Karl Mayer draw warper and a Barmag draw warper: on the Mayer equipment with a stationary hot draw pin, on the Barmag equipment using the relax plate for heat setting and on the Barmag equipment using the standard set plate for heat setting. Process conditions (speed, set plate temperature, and overfeed) were varied with each of these arrangements. Each process gave textile yarns having desirably low boil off shrinkages and tenacity values while keeping the elongation to break adequately high. Although some differences were found in resulting flat yarn properties from the various equipment arrangements, the differences were generally small when similar process settings were used.

The process settings when using the standard Mayer draw warper (with a stationary hot draw pin) involved using a draw ratio of 1.51X, and temperatures of 60° C. for all the rolls, of 85° C. for the predraw plate and of 100° C. for the draw pin, whereas the speeds varied from 300 to 500 ypm, the set plate temperature varied from 150° to 180° C., and there was used from zero up to 5% overfeed (for relaxing). The tenacities of the resulting flat (textile) yarns ranged from 1.9 to 2.4 gpd, being mostly from 2.0 to 2.3 gpd, with elongations of from 25 to 35%, and modulus from 45 to 60 gpd, boil-off shrinkage generally about 5% (with one at 7.8% and another at 5.9%) and excellent shrinkage uniformity as shown by a standard deviation of less than 1% and mostly less than 0.25%, and dry heat shrinkages (160° C.) mostly less than about 7%, with one value at about 9%. Higher tenacity (with lower elongation) can be obtained by using higher draw ratios, but this will tend to reduce the knitting and napping performance of the resulting yarn. Lower tenacity and higher elongations can be obtained at lower draw ratios, but this will result at some point in high denier spread and fabric defects.

A continuity run was made using this feed yarn and the Mayer draw warper with the settings given in Table IB to evaluate the potential for finish deposits. The feed yarn ran well, and no finish deposits or smoke were noted during the run.

TABLE IB

| Beaming Speed | 300 ypm |
|---|---|
| Roll Temperature | 60° C. |
| Predraw Plate Temperature | 85° C. |
| Draw Pin Temperature | 100° C. |
| Set Plate Temperature | 155° C. |
| Draw Ratio | 1.51 |
| Percent Relaxation | 0 |
| Resulting flat (textile) yarn properties were: | |
| Denier | 63 |
| Modulus gpd | 51.0 |
| Tenacity gpd | 2.1 |
| Elongation % | 33.4 |
| Boil-off-shrinkage % | 3.8 |
| Dry Heat Shrinkage % | 5.1 |

The ranges of process controls and yarn properties resulting from draw-warping on the Barmag machine are given in Table IC.

TABLE IC

BARMAG WARPER TESTS AND RESULTING YARN PROPERTIES

| | Constant Process Controls | Variable Process Controls |
|---|---|---|
| A. Barmag with Heat Setting Done on Relax Plate | | |
| Roll 2 Temp. | 60° C. | Relax Plate Temp. 150 to 180° C. |
| Roll 3 (Draw Roll) Temp. | 85° C. | Speed 300 to 500 m/m |
| Draw Ratio | 1.50 X | Percent Relaxation Zero to 5% |
| Set Plate Temp. | Off | |
| B. Barmag with Heat Setting on Set Plate | | |
| Roll 2 Temp. | 60° C. | Speed 300 to 600 m/m |
| Roll 3 Temp. | 85° C. | Set Plate Temp. 140 to 180° C. |
| Draw Ratio | 1.50 X | |
| Relax Plate Temp. | Off | |
| Zero Percent Relaxation | | |

| Resulting Yarn Properties (Total Range) | A | B |
|---|---|---|
| Denier | 58.5–61.5 | 58.6–59.0 |
| Tenacity, g/d | 1.9–2.4 | 2.1–2.4 |
| Elongation to Break, % | 30.5–49.6 | 27.9–34.7 |
| Modulus, g/d | 44.7–59.6 | 58.7–68.1 |
| Boil-off-Shrinkage % | 3.7–18.7 | 5.3–12.7 |
| Dry Heat Shrinkage at 160° C., % | 5.1–22.1 | 6.7–12.5 |

EXAMPLE 2

A 175 denier, clear copolyester feed yarn was produced in essentially similar manner on standard DTFY equipment and draw warped on a Karl Mayer draw warper. Feed yarn properties are in Table II.

TABLE II

| Denier | 175 |
|---|---|
| % Denier Spread | 1.6 |
| Draw Tension (1.71 at 185° C.) | 68.0 |
| Filament shape | trilobal |

TABLE II-continued

| | |
|---|---|
| Number of filaments | 50 |
| Interlace, RPC | 6.6 |
| % FOY | 0.66 |
| % TiO$_2$ | 0.02% |
| Polymer LRV | 13.2 |

This feed yarn was draw warped at 1.51 draw ratio on a Karl Mayer draw warper using an unheated rolling pin for draw instead of the standard hot stationary draw pin, and the same ranges for process variables (speed, set plate temperature and overfeed) as in Example 1. For this test series, the roll temperature was kept constant at 85° C. and the predraw plate heater was turned off. The resulting flat textile yarns had tenacities of from 2.0 to 2.3, with one at 2.4 gpd, with elongations between 35 and 45%, and modulus from about 45 to 55 gpd, and boil-off shrinkages again about 5% or less, with one value at 7.6%, and another at 5.8%, and good shrinkage uniformity, as shown by a standard deviation of 1% or less and several about 2-5% or less, and likewise low dry heat shrinkages (160° C.) of less than 9% and generally 7% or less.

This same feed yarn was processed at a mill on a standard Karl Mayer draw warper with a stationary hot draw pin and used to make unusually soft, lustrous and easily napped fabrics. During these runs the defect level during draw warping was found to be approximately 0.010 D/MEY which is considerably lower than required for a successful draw warp operation. D/MEY is an expression used to indicate the number of defects per "million end yards", so a value of 0.010 D/MEY is an extremely low defect level.

EXAMPLE 3

An experimental semi-dull copolyester feed yarn was produced by spinning at a withdrawal speed of 3300 ypm on standard DTFY spinning equipment and draw warped on a Karl Mayer draw warp machine using a hot stationary draw pin. The feed yarn was drawn with and without relaxation to approximately 30 to 35% elongation to break. The predraw plate was heated to 88° C. and the draw pin was heated to 100° C. The set plate was heated to 150 to 155° C. The draw ratio was 1.4X. The feed yarn ran well on the draw warper. Beam sets were made and later knit, dyed, and napped to obtain finished fabrics. The fabrics had an unusually soft hand and clean appearance. Draw warping and knitting performance were very acceptable for development work, but it was noted that a higher level of an improved spin finish that carries through the draw warp process would be desirable to improve performance in knitting.

Feed yarn properties are given below:

TABLE III

| | |
|---|---|
| Denier | 115 |
| % Denier Spread | 3.3 |
| Draw Tension | 52.5 |
| (1.71 at 185° C.) | |
| Interlace, RPC | 7.9 |
| FOY, % | 0.52 |
| Filament Shape | trilobal |
| Number of Filaments | 34 |
| Copolymer LRV | 13.0 |
| % TiO$_2$ | 0.3 |

EXAMPLE 4

A 60 denier, semi-dull, copolyester feed yarn for draw warping was produced on existing DTFY spinning equipment and draw warped on a Mayer draw warper. The feed yarn had the following properties:
Denier: 60
Denier Spread: 1.9
Draw Tension, g: 22.0
Interlace, RPC: 6.5
Number of Filaments: 27
Filament Shape: Trilobal
Polymer LRV: 12.9
FOY, %: 0.67
% TiO$_2$: 0.3
The draw warping conditions were as follows:
Process Speed: 500 ypm
Roll Temperature: 60° C.
Predraw Plate Temperature: 85° C.
Hot Pin Temperature: 105° C.
Set Plate Temperature: 160° C.
Draw Ratio: 1.51
Percent Relaxation: 0%
The drawn yarn properties resulted:
Denier: 40
Tenacity, g/d: 2.4
Elongation %: 35.9
Modulus, g/d: 45.5
Boil-off-shrinkage, %: 5.2
Dry Heat Shrinkage (160° C.), %: 6.8

The yarn gave good draw warping performance with a defect level of only 0.09 D/MEY Since a volatile spin finish was used on the feed yarn, an overlube was applied during draw warping to provide additional protection for knitting. According to the invention, however, low fuming, non volatile finishes, such as described hereafter, are preferred to be applied during spinning so that exhaust hoods and overlubing will not be required during draw warping.

As will be evident to those skilled in the art, many variations are possible, without departing from the concept of the invention For instance, the polymer may contain additives, such as TiO$_2$, which is a conventional additive, and variation of the TiO$_2$ content can be used to differentiate the luster of the filaments, e.g., from clear through semi-dull to matte. Thus, suitable contents of TiO$_2$ may vary from about 0 up to about 2%. Similarly, other additives may be included. Furthermore, although conventionally the 2G-T/SSI copolyester has contained about 2 mole % of 5-sodium-sulfoisophthalate residues, instead of terephthalate residues, the precise amount may be varied, as taught in the art, to obtain more or less affinity for cationic dyestuffs, and so a deeper or lighter dyeing in the eventual filaments, or to obtain other results that may be advantageous from this variation. Other variations may be made to the preparation or processing of the filaments and yarns, even if this has not been specifically disclosed in the Examples herein. It may also be advantageous to use mixtures of cross-sections and deniers for aesthetic or other purposes.

Reference is also made to, and the disclosure is hereby incorporated herein, my copending application Ser. No. 426,372, filed 10/28/89, and covering heather yarns.

I claim:

1. An interlaced multifilament draw-warping feed yarn consisting essentially of spin-oriented poly[ethylene terephthalate/5-sodium-sulfo-isophthalate] copolyester filaments containing about 2 mole % of ethylene 5-sodium-sulfo-isophthalate repeat units, being of denier about 40 to about 300, having an average interlace level of about 5.5 to about 9.5 RPC, and being provided with a finish that is stable enough to persist on such yarn after draw-warping in sufficient quantity and in such condition as to provide finish to enhance knitting performance.

2. A feed yarn according to claim 1, wherein the average interlace level is about 5.5 to about 7.5 RPC.

3. A feed yarn according to claim 1 or 2, wherein the spin-oriented filaments have been obtained by spinning at a withdrawal speed of less than about 3000 ypm.

4. A process for preparing a flat multifilament interlaced textile yarn consisting essentially of poly[ethylene terephthalate/5-sodium-sulfoisophthalate]copolyester filaments containing about 2 mole % of ethylene 5-sodium-sulfo-isophthalate repeat units, being of denier about 20 to about 150 and having a tenacity of about 1.5 to about 2.5 grams per denier and elongation to break of about 10 to about 50%, and boil-off shrinkage about 2 to about 10%, by first forming by high-speed spinning an interlaced multifilament draw-warping feed yarn of elongation about 80% to about 180% and of boil-off shrinkage at least about 40% according to claim 1 or 2, and then draw-warping said feed yarn to reduce the elongation to about 10% to about 50% and the shrinkage to about 2% to about 10%.

* * * * *

UNITED STATES PATENT OFFICE
CERTIFICATE OF CORRECTION

PATENT NO. : 4,929,698
DATED : May 29, 1990
INVENTOR(S) : John Franklin Hagewood et al.

It is certified that error appears in the above-identified patent and that said Letters Patent is hereby corrected as shown below:

On the title page, item [75]:

Please add as co-inventors Jerry Thomas Charles and Lawrence Stephen Shea.

Signed and Sealed this

Twenty-third Day of July, 1991

Attest:

HARRY F. MANBECK, JR.

*Attesting Officer*   *Commissioner of Patents and Trademarks*